US011086483B2

(12) United States Patent
Kim

(10) Patent No.: US 11,086,483 B2
(45) Date of Patent: Aug. 10, 2021

(54) GLOBAL FILTER

(71) Applicant: salesforce.com, inc., San Francisco, CA (US)

(72) Inventor: Yuseung Kim, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 237 days.

(21) Appl. No.: 15/941,944

(22) Filed: Mar. 30, 2018

(65) Prior Publication Data
US 2019/0302969 A1  Oct. 3, 2019

(51) Int. Cl.
G06F 3/048 (2013.01)
G06F 3/0482 (2013.01)
G06F 9/451 (2018.01)
G06F 3/0481 (2013.01)
G06F 3/0485 (2013.01)

(52) U.S. Cl.
CPC ............ *G06F 3/0482* (2013.01); *G06F 3/048* (2013.01); *G06F 3/04817* (2013.01); *G06F 3/04855* (2013.01); *G06F 9/451* (2018.02)

(58) Field of Classification Search
CPC ........ G06F 3/048; G06F 3/0482; G06F 9/451; G06F 3/04817; G06F 3/04855
See application file for complete search history.

(56) References Cited

U.S. PATENT DOCUMENTS

| | | | | |
|---|---|---|---|---|
| 2010/0302277 A1* | 12/2010 | Jiang | ................... | G06F 3/04845 345/650 |
| 2011/0161853 A1* | 6/2011 | Park | ..................... | G06F 3/0486 715/769 |
| 2013/0103701 A1* | 4/2013 | Vishnubhatta | ........ | G06F 16/284 707/754 |
| 2013/0347070 A1* | 12/2013 | Cairns | .................... | H04L 63/08 726/3 |
| 2014/0181686 A1* | 6/2014 | Shin | ........................ | G06F 3/038 715/748 |
| 2014/0208215 A1* | 7/2014 | Deshpande | ............ | G06Q 10/00 715/736 |
| 2015/0149930 A1* | 5/2015 | Walkin | .................. | H04L 65/403 715/753 |
| 2016/0103592 A1* | 4/2016 | Prophete | ................ | G06Q 10/10 715/771 |
| 2016/0162165 A1* | 6/2016 | Lingappa | .............. | G06T 11/206 715/771 |
| 2016/0196017 A1* | 7/2016 | Lee | ...................... | H04N 21/482 715/845 |

* cited by examiner

*Primary Examiner* — Xuyang Xia
(74) *Attorney, Agent, or Firm* — Sterne, Kessler, Goldstein & Fox P.L.L.C.

(57) ABSTRACT

Disclosed herein are system, method, and computer program product embodiments for using a global filter in an analytics interface. An embodiment operates by rendering a layout listing displayed and hidden filterable data sets. The embodiment renders a global filter tray accessible from the layout by tapping or clicking a global filter icon. The global filter tray displays a list of available filters offered for the filterable data sets. The embodiment applies a selected filter to refine both displayed filterable data sets and the hidden filterable data sets.

17 Claims, 10 Drawing Sheets

GLOBAL FILTER

BACKGROUND

Organizations increasingly accumulate and harbor ever-larger and more diverse data sets. Ascribing meaning to and deriving analytical significance and cogent conclusions from these large data sets can be arduous. An analytics system or platform simplifies the difficulties by allowing for the methodical exploration of an organization's data. The analytics platform provides a mechanism by which the data sets can be examined and analyzed in a centralized location using a standardized interface or data visualization tool.

Such a visualization tool may include one or more dashboards displaying assets, i.e., data sets or analyses thereof, in a unified, consistent fashion. Different dashboards may display different assets; for example, in an analytics tool, one dashboard could display assets representing sales data and another dashboard could display assets representing customer service data. The nature and subject of the dashboards and assets will differ significantly according to the unique requirements of the wide-variety of organizations and individuals using analytics platforms.

A user of an analytics platform can gain further insights by filtering the dashboards and assets using standard or customizable filters. A user may want to navigate between different dashboards while preserving selected filters. Additionally, some filters may be applied automatically to all assets with stored values or values received from ancillary systems. Given that the data sets informing the assets can be quite large, performance optimization for filters is of paramount importance. Thus, a need exists for a software interface including a global filter that enables a user to filter dashboards and assets in an analytics platform.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digits) of a reference number identifies the drawing in which the reference number first appears.

DETAILED DESCRIPTION OF THE INVENTION

Figure 1:
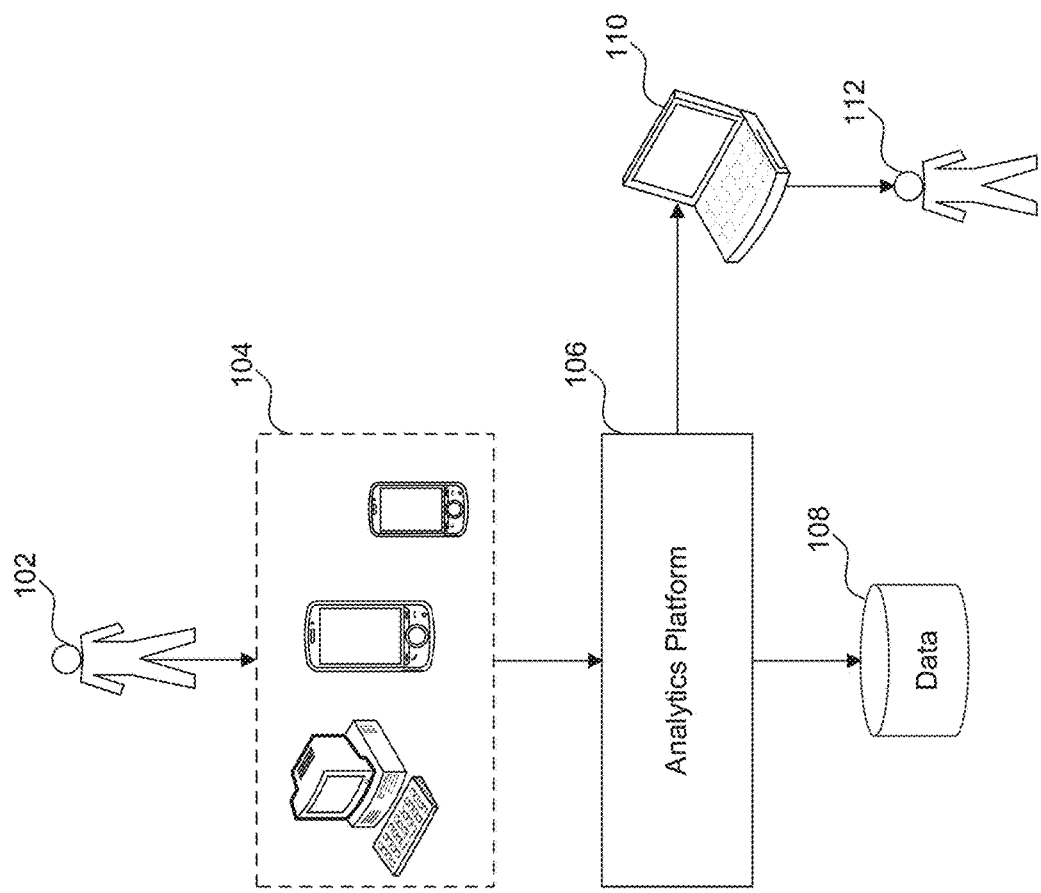
FIG. 1 is a block diagram of an analytics system, according to some embodiments.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions may be described herein as performing certain actions. However, these descriptions are merely for convenience, and these actions result from computing devices, processors, controllers, or other devices executing the firmware, software, routines, and/or instructions. Further, any implementation variations may be carried out by a general purpose computer, as described below.

Any reference to the term "module" shall be understood to include at least one of software, firmware, and hardware (such as one or more circuit, microchip, or device, or any combination thereof) or any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

Provided herein are system, apparatus, device, method and/or computer program product embodiments, and/or combinations and sub-combinations thereof, for providing a global filtering mechanism in an analytics visualization tool.

In some embodiments, an analytics platform may include one or more dashboards. As would be appreciated by a person of ordinary skill in the art, a dashboard may also be referred to as a portal, launch pad, or home screen. A dashboard may display more than one asset in a unified fashion. Different dashboards may display different assets. One asset may be included in more than one dashboard.

In some embodiments, an asset may be a data object or application. In an embodiment, an asset may represent one or more key metrics or trends of a business, organization, or other type of entity. An asset can utilize data sets stored internally by the organization or individual and/or interface with an external system to receive a dataset informing the asset. Because a dashboard may display multiple assets, a user may view multiple key metrics or trends utilizing a common theme, for example: sales performance, customer service, future business opportunities, product performance, employee performance, geographical analysis, etc.

In some embodiments, the visualization tool may enable a user to switch from a currently opened dashboard to a different dashboard. A user may switch to a different dashboard by using a suitable input mechanism such as swiping down from the top of the screen with their finger, tapping with their finger, clicking with a mouse, or utilizing another appropriate input mechanism. In an embodiment, a user may also close a dashboard or open new dashboards through similar input mechanisms.

In an embodiment, an analytics platform provides filtering mechanisms to cull and refine the data integrated into the dashboards, allowing a user to methodically explore the data and gain deeper insights. Such filters can be standardized or custom-built. Filters can provide a myriad of approaches to limiting data including checkboxes, editable fields, text areas, sliders, ranges, etc. Such filters can accept a variety of data types such as integers, decimals, dates, timestamps, dollar values, texts, strings, etc. A user can select an appropriate filter and see the results in the opened dashboard(s) based on their filter selections.

Filters can be global or local. A local filter applies only to the particular selected dashboard. For example, if the dashboard displays all sales for an organization, a local filter could include a slider displaying a range of dollar amounts. As the user narrows the dollar range, the dashboard would only display the sales within the selected dollar range, narrowing the results. Such a local filter would apply to the selected sales dashboard and would not apply to a dashboard tracking service calls or other dashboard without a cost data element. A global filter applies to all dashboards.

In the visualization tool, a global filter tray can be used to display available filters. However, the global filter tray may take up a large amount of space when opened in the visualization tool, especially if viewed from a mobile device and/or in dashboards displaying multiple assets. A global filter tray can potentially be unwieldy and consume space that could alternatively display informative dashboard content.

However, adding the global filter tray as a separate layer, as though it were a separate dashboard, can overcome these concerns. The global filter tray is independently scrollable so it can accommodate a long list of filters. Users retain access to any assets in the dashboard and can continue to toggle or switch between dashboards. Users can immediately view data changes in the selected dashboards when updating the global filters. Redundant queries can be avoided, reducing load-time and memory loss.

The global filter tray only displays in the visualization tool when the global filter icon is touched, clicked, or receives another suitable input. The global filter icon displays continuously and unobtrusively. The global filter tray can subsequently be re-hidden and re-displayed by further input upon the global filter icon.

FIG. 1 is a block diagram of an analytics system 100, according to some embodiments. Analytics system 100 includes user 102, device 104, analytics platform 106, data sets 108, configuration tool 110, and administrator 112.

User 102 can be a person utilizing device 104 to interact with analytics platform 106. User 102 can be a business owner, employee, agent, or another suitable individual interacting with information relevant to a business, company, non-profit, governmental agency, or any other suitable organization. Conversely, user 102 can use analytics platform 106 for individual pursuits or reasons unrelated to any business or organizational goals.

Device 104 can be a cellphone, smartphone, tablet computer, laptop computer, desktop computer, web browser, or any other suitable computing device. Device 104 can be configured to connect to and communicate with analytics platform 106.

Analytics platform 106 is a system by which user 102 can view and interact with data relevant to their personal or organizational goals. Analytics platform 106 organizes the information into dashboards and assets. A dashboard may also be referred to as a portal, launch pad, or home screen. In an embodiment, an asset may represent one or more key metrics or trends of a business, organization, or other type of entity based on data sets within the purview of the organization. Analytics platform 106 can provide a user interface to user 102 to facilitate interactions adhering to design principles of human-computer interaction. Analytics platform 106 is described in further detail below in the discussion of FIG. 2.

Data sets 108 can be database tables, text files, binary data or any other data type storing information relevant to the organization or individual. Data sets 108 inform the assets displayed in analytics platform 106; i.e., analytics platform 106 uses data sets 108 to build the assets. Data sets 108 can be readable, modifiable data, log files, cloud data, etc. In an embodiment, data sets 108 can be customer-relationship-management data or other business-related information. Data sets 108 can be data stored within an organization, imported from other systems, or retrieved through integratory processes.

Configuration tool 110 provides a mechanism by which administrator 112 can configure and roll-out new dashboards, design new assets, charts, and figures, control permissions, incorporate additional data sets 108, etc. In an embodiment, configuration tool 110 can process web-based traffic and HTTP request methods, employing a standard web server technology, for instance Microsoft IIS or Apache, to listen for, process, and respond to any of incoming hits/requests. In some embodiments, configuration tool 110 returns pages to administrator 112 via HTTP, which configuration tool 110 formulates in accordance with hypertext transfer protocol W3C standards. The returned pages also include images, stylesheets, and scripts, the content and nature of which will be appreciated by those skilled in the relevant arts. In other embodiments, account management center specifically formats the responses for viewing on a mobile device in adherence with W3C mobile web best practices.

Administrator 112 can be an employee, engineer, data scientist, business owner, individual, group or other suitable party that builds dashboards and assets for analytics platform 106.

Figure 2:
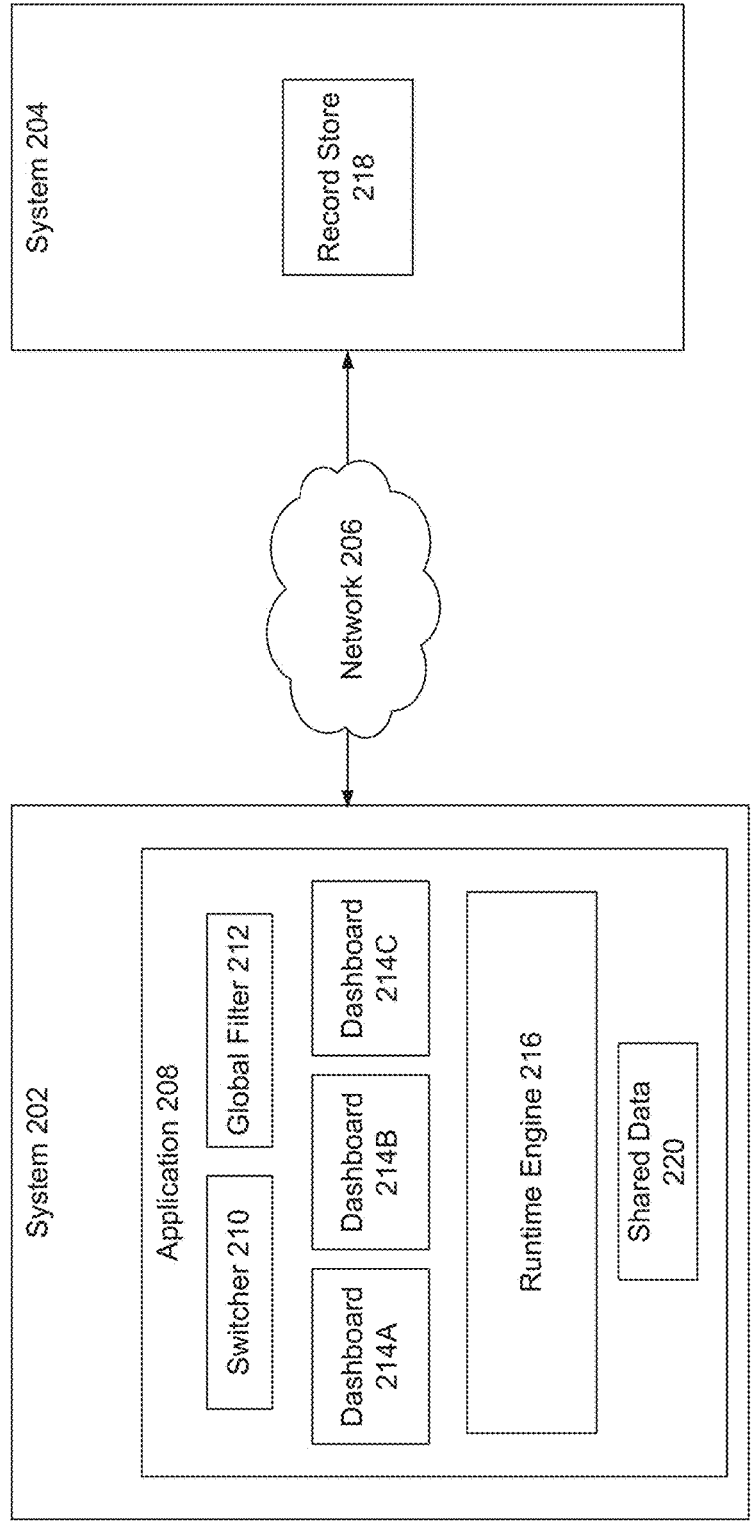
FIG. 2 is a block diagram of an analytics platform, according to some embodiments.

FIG. 2 is a block diagram of an analytics platform 200, according to some embodiments. Analytics platform 200 includes system 202, system 204, network 206, application 208, switcher 210, global filter 212, dashboard 214, runtime engine 216, record store 218, and shared data 220.

System 202 provides a mechanism for user 102 to view and analyze data sets 108 through dashboards and assets included therein. In some embodiments, system 202 may be a desktop computer, laptop, tablet, mobile device, wearable electronic device, or other electronic device.

In some embodiments, system 204 may be a server computer, desktop computer, laptop, tablet, mobile device, wearable electronic device, or other electronic device. In some other embodiments, system 204 may be a software platform for cloud computing. In an embodiment, system 204 is a data repository. As would be appreciated by a person of ordinary skill in the art, system 202 may be connected to multiple systems 204.

In some embodiments, system 204 may store one or more data objects in record store 218. Record store 218 may be a database or other type of data store. A data object may be an item or collection of data. For example, a data object may be customer sales data, customer service data, or other customer relationship management data store. As would be appreciated by a person of ordinary skill in the art, a data object may be various other types of data.

In some embodiments, network 206 may be any network or combination of networks including the Internet, a local area network (LAN), a wide area network (WAN), a wireless network, a cellular network, or various other types of networks as would be appreciated by a person of ordinary skill in the art.

In some embodiments, system 202 includes application 208. For example, application 208 may be a customer relationship management application that runs on system 202. In some embodiments, application 208 may be a web application designed to run inside a web browser. In some other embodiments, application 208 may be a software application designed to run on a desktop computer, laptop, tablet, mobile device, wearable electronic device, or other electronic device. As would be appreciated by a person of ordinary skill in the art, application 208 may be another suitable type of software application.

In some embodiments, application 208 may include switcher 210, global filter 212, one or more dashboards 214 and runtime engine 216. In some embodiments, application 208 may load a dashboard 214 into memory in response to a user selection. Application 208 may load more than one dashboard 214 into memory. In some embodiments, application maintains a single dashboard 214 in memory at a time.

Switcher 210 provides a mechanism by which user 102 can switch or toggle between dashboards. In some embodiments, user 102 may want to switch to a different dashboard 214 and may switch to a different dashboard 214 by activating switcher 210. In some embodiments, user 102 may activate switcher 210 through a user-input gesture (e.g., swiping down from the top of the screen with their finger). In some other embodiments, user 102 may activate switcher 210 by clicking a user interface element in selected dashboard 214. As would be appreciated by a person of ordinary skill in the art, user 102 may activate switcher 210 using various other mechanisms.

In some embodiments, switcher 210 may display a collection of dashboards 214 that user 102 can switch to. In some embodiments, the collection may include dashboards 214 that have been previously opened or never opened. In some embodiments, switcher 210 may be a header that overlays a portion of the currently selected dashboard 214 and the collection of dashboards 214 that user 102 can switch to. This may enable user 102 to simultaneously see the currently selected dashboard 214. Because switcher 210 can be activated while within a currently selected dashboard 214, user 102 can navigate to another dashboard 214 without having to first close the currently selected dashboard 214. This may improve the user experience because a dramatic context change may not occur when switching between dashboards 214. In some embodiments, switcher 210 may be a header that displays a collection of dashboards 214 that user 102 can switch to in a scrollable fashion. This works well for a large number of dashboards 214, including those with long names.

Global filter 212 allows user 102 to filter data sets 108 included in dashboards 214 in a myriad of ways, allowing a user to gain further insights. Such filters can be standardized or custom-built. Filters can take numerous forms including checkboxes, editable fields, text areas, sliders, ranges, etc. Filters can accept a variety of data types such as integers, decimals, dates, timestamps, dollar values, texts, strings, etc. User 102 can select an appropriate filter and see the result in dashboards 214.

In some embodiments, runtime engine 216 may be utilized by system 202 to render assets in dashboards 214 and to apply any selected filters in global filter 212. In some embodiments, runtime engine 216 may formulate and run queries using predicates formed from selected filters in global filter 212. Runtime engine 216 may be a program, database tool, or module available to system 202. Runtime engine 216 may interact directly with system 204. In some embodiments, because runtime engine 216 is shared among multiple dashboards 214, each dashboard 214 does not need to store its own runtime engine 216, reducing memory usage.

In some embodiments, runtime engine 216 may store data common among dashboards 214 in shared data 220. Because the data is shared among multiple dashboards 214, the amount of memory allocated among multiple dashboards 214 can be reduced. For example, application 208 may load a selected dashboard 214 into memory that contains its own dashboard specific data but not data in shared data 220.

In some embodiments, shared data 220 may include definitions of assets assigned to the one or more dashboards 214. For example, in some embodiments, a definition of an asset may include one or more database queries performed by the asset. In some embodiments, shared data 220 may include display definitions assigned to one or more dashboards 214. For example, in some embodiments, a display definition may describe how to layout assets, a dashboard color scheme, and/or a dashboard orientation. In some embodiments, runtime engine 216 may store shared data 220 in memory or a secondary storage (e.g., hard disk drive).

In some embodiments, runtime engine 216 may load one or more assets assigned to a dashboard 214 in response to a user selection of the dashboard. For example, in some embodiments, runtime engine 216 may load definitions of the one or more assets from shared data 220.

In some embodiments, runtime engine 216 may load one or more display definitions assigned to dashboard 214 in response to a user selection. In some embodiments, runtime engine 216 may load default display definitions assigned to the dashboard 214 including pre-configured local or global filters. In some embodiments, runtime engine 216 may load unique display definitions assigned to the selected dashboard 214. In some embodiments, runtime engine 216 may load the display definitions from shared data 220.

In some embodiments, runtime engine 216 may execute one or more assets for the selected dashboard 214. In some embodiments, an asset may be a data object. Thus, in this case, runtime engine 216 may simply display the data object. In some other embodiments, an asset may be an application that displays data of interest to a user. In some embodiments, the asset may be a web application that queries a record store (e.g., record store 218) and presents the results to a user in a dashboard 214. For example, the asset may be web application that generates and displays a chart of weekly sales in a dashboard 214 from sales data stored in record store 218. In some embodiments, the asset may be an application that queries multiple record stores and summarizes the resulting data from the multiple record stores for display in a dashboard 214. In other embodiments, the asset may be a data set to which filters can be applied with limiting predicates.

As discussed above, different dashboards 214 may include different assets. For example, application 208 may have a dashboard 214 for analyzing sales data, a dashboard 214 for analyzing customer service data, and a dashboard 214 for analyzing marketing data. In some embodiments, application 208 may provide one or more predefined dashboards 214. A predefined dashboard 214 may include one or more assets and display the one or more assets according to display settings. In some other embodiments, a user may define a custom dashboard 214. In some embodiments, the user may assign one or more assets to the custom dashboard 214. In some embodiments, the user may further configure the display of custom dashboard 214 by assigning display specifications to dashboard 214.

Figure 3:
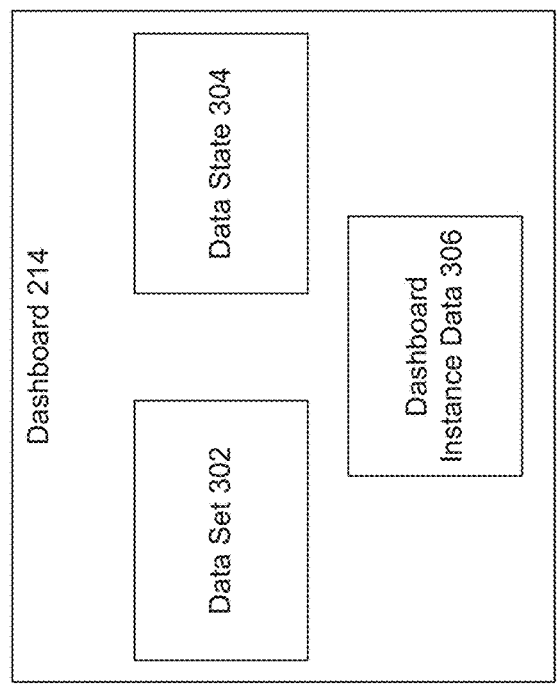
FIG. 3 is a block diagram of a selected dashboard, according to some embodiments.

FIG. 3 is a block diagram of a currently selected dashboard 214, according to some embodiments. Dashboard 214 may include data set 302, data state 304, and dashboard instance data 306. FIG. 3 is discussed below with reference to FIG. 2.

In some embodiments, data set 302, data state 304, and dashboard instance data 306 may represent data and information specific to the currently selected dashboard 214. In other words, data set 302, data state 304, and dashboard instance data 306 may represent data that is not shared among multiple dashboards 214, i.e., data that is not stored in shared data 220.

In some embodiments, application 208 may store the data pertaining to one or more assets of the currently selected dashboard 214 in data set 302. For example, application 208 may store the data resulting from one or more queries to system 204 in data set 302. Similarly, application 208 may store data generated by an asset (e.g., a graph or chart) in the currently selected dashboard 214 in data set 302. Application 208 may apply any filters selected in global filter 212 to assets in dashboard 214 to limit the data. In an embodiment, application 208 can create appropriate predicates to reflect the filters, append the predicates to the queries in data set 302, and refresh data set 302 based on the selected filters. In an alternate embodiment, application 208 can pass the selected filters as parameters to a module or function in order to rebuild and refresh the assets based on the selected filters.

In some embodiments, application 208 may store data set 302 in a cache. In some other embodiments, application 208 may store data set 302 in secondary storage (e.g., hard disk drive). The storage of the data resulting from the execution one or more assets of the currently selected dashboard 214 in data set 302 may reduce network requests when switching back to the currently selected dashboard 214 because the data does not need to be requested or generated again. Similarly, the storage of data generated by an asset in data set 302 may eliminate computation because the data can be retrieved from data set 302 instead of regenerated again.

In some embodiments, application 208 may track changes to currently selected dashboard 214. For example, application 208 may track changes to the layout of selected dashboard 214, the assets being displayed, the color scheme, etc. In some embodiments, application 208 may store these changes in data state 304. In some embodiments, application 208 may store data state 304 in a cache (e.g., memory). In some other embodiments, application 208 may store data state 304 in secondary storage (e.g., hard disk drive).

In some embodiments, application 208 may represent the currently instantiated assets (e.g., the assets loaded into memory) and the applied layout, orientation, and color scheme as dashboard instance data 306. In some embodiments, dashboard instance data 306 represents data that defines an instance of currently selected dashboard 214. Dashboard instance data 306 may represent data outside of data set 302 and data state 304 that can be regenerated from shared data 220 by application 208.

In some embodiments, dashboard instance data 306 may exist while currently selected dashboard 214 is being displayed. For example, in some embodiments, dashboard instance data 306 is stored in memory while the currently selected dashboard 214 is being displayed. In some embodiments, when a user selects a different dashboard 214, dashboard instance data 306 may be removed from memory.

FIGS. 4A-4D are screen displays 400 including a global filter in an analytics interface, according to some embodiments. Screen displays 400 includes global filter icon 402 and global filter tray 404. FIGS. 4A-4D reflect an "About Wave For Sales" system, however, this is just one exemplary embodiment. Screen displays 400 could render dashboards, assets, and filters for any number of subjects, customers, businesses, etc. Global filter icon 402 and global filter tray 404 provide one exemplary embodiment of global filter 212 in FIG. 2.

Global filter icon 402 provides a visual cue/link that user 102 can use to bring global filter tray 404 into view. Global filter icon 402 can hide global filter tray 404 if global filter tray 404 is already in view. In an embodiment, global filter icon 404 also displays a number indicating the number of filtering mechanisms available within global filter tray 404. In FIGS. 4A-4D, for example, the integer that displays is "4" because there are four available filters in global filter tray 404 ("Region," "Amount," "Time," and "Owner Name").

In an embodiment, global filter icon 402 can be disabled, made un-clickable, greyed out, or hidden if no global filtering mechanisms are available. FIGS. 4A-4D portrays global filter icon 402 with some particularity as a wineglass-resembling image; however, this is just one exemplary illustration and global filter icon 402 could be any suitable image.

In some embodiments, user 102 may activate global filter icon 402 with a user-input gesture such as tapping global filter icon 402. In some other embodiments, user 102 may activate global filter icon 402 by clicking global filter icon 402 with a pointer, mouse, or keyboard. As would be appreciated by a person of ordinary skill in the art, user 102 may activate global filter icon 402 using various other mechanisms.

In an embodiment, as a result of receiving an input on global filter icon 402, analytics platform 106 can display global filter tray 404. Global filter tray 404 can be a separate layer, screen, frame, iframe, etc. In an alternate embodiment, global filter tray 404 displays as another page in selected dashboard 214. In an embodiment, global filter tray 404 can be independently scrollable allowing users to access the full list of available global filters while still accessing any charts or assets in selected dashboard 214. Global filter tray 404 can display all available global filters or subset thereof.

Figure 4A:
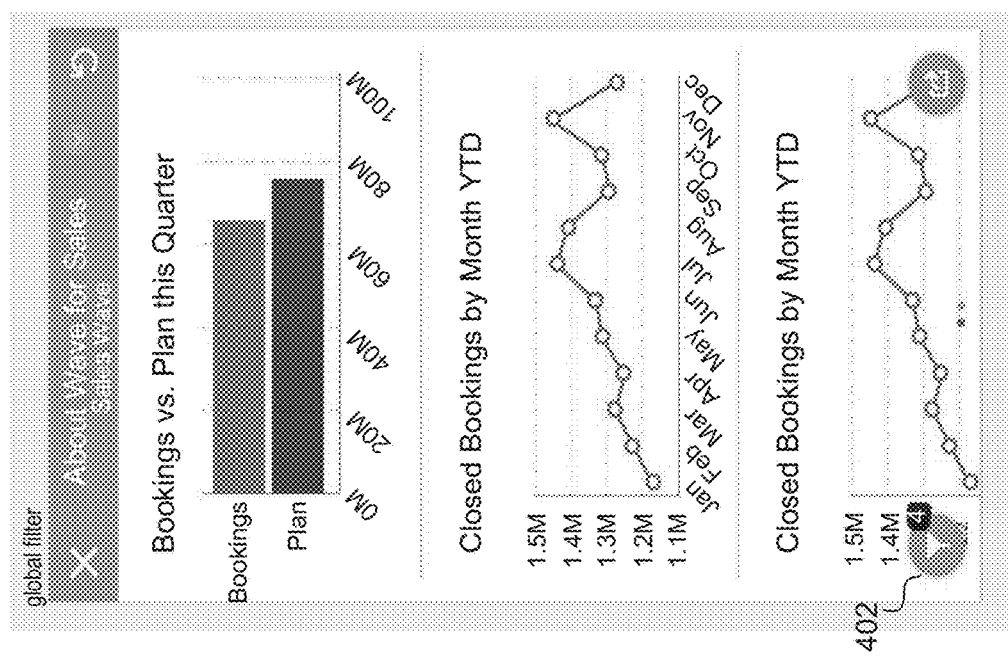
FIGS. 4A-4D are screen displays of a global filter in an analytics interface, according to some embodiments.
Figure 4B:
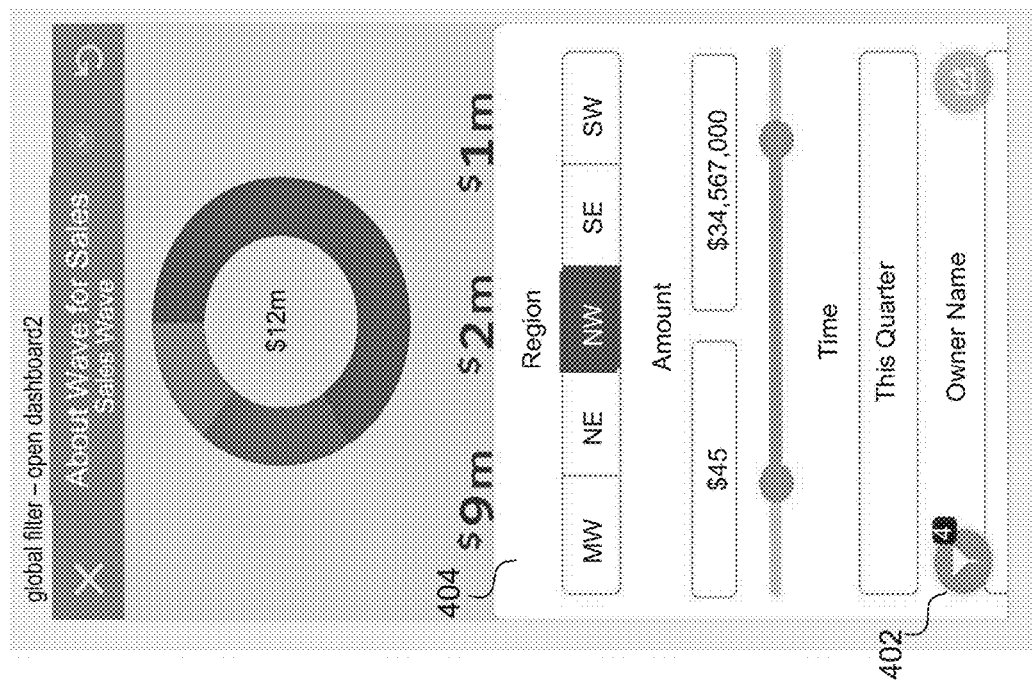
Figure 4C:
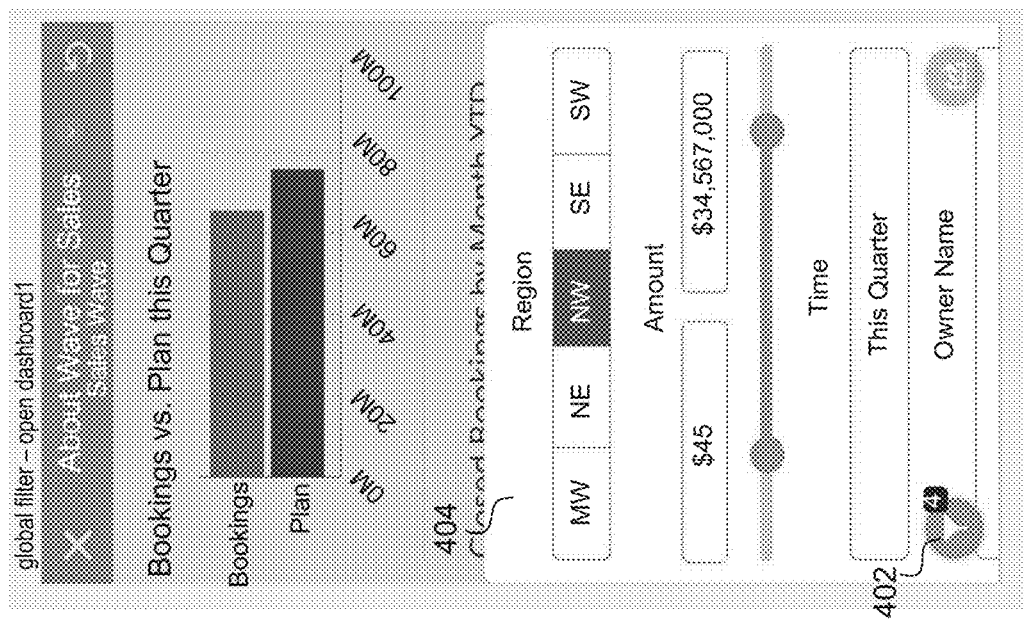
Figure 4D:
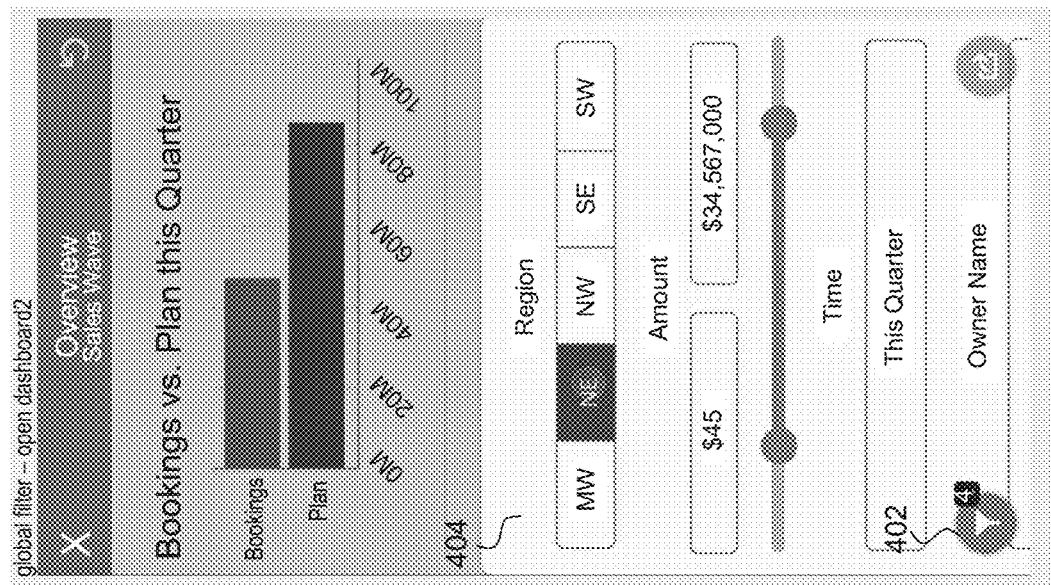

FIG. 4A reflects an exemplary initialized state of screen display 400. FIG. 4A displays global filter icon 402 in the lower left corner of screen display 400. In FIG. 4A, global filter icon 402 has not yet been clicked or tapped. FIG. 4B displays screen display 400 after global filter icon 402 receives an input. Global filter tray 404 now displays and includes the available global filters. FIG. 4C displays a change to dashboard 214 being viewed via switcher 210. Global filter tray 404 remains in view and independently scrollable. FIG. 4D displays a change to global filter tray 404, the "Region" changed to "NE." The asset in selected dashboard 214 updates to reflect this change in global filter tray 404.

Figure 5:
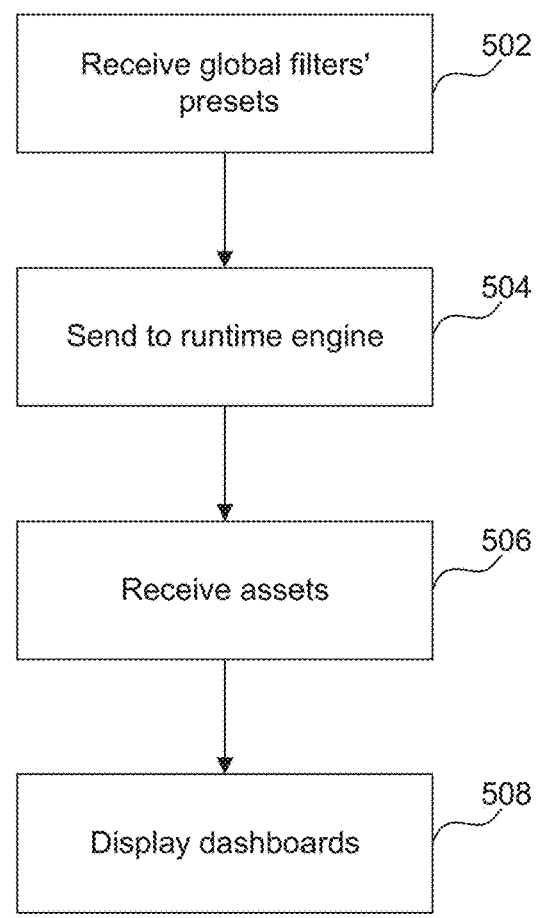
FIG. 5 is a flowchart illustrating a method of initializing a dashboard based on presets in the global filter, according to some embodiments.

FIG. 5 is a flowchart illustrating a method 500 of initializing dashboards 214 based on pre-configured settings for a global filter, according to some embodiments. By initializing the dashboard with the pre-configured settings applied, performance gains can be achieved through the elimination of redundant queries.

In 502, method 500 receives pre-configured settings for global filter 212. The presets can be a set of filters applicable across all dashboards along with associated values for these filters. In one exemplary instance, the pre-configured filters could ensure that user 102 sees only data across all dashboards for sales that user 102 created or is associated with. In the exemplary global filter tray 404 displayed in FIGS. 4A-4D, pre-configured settings could be received for "Region," "Amount," "Time," and "Owner Name." In this embodiment, the associated values could be "NW" for "Region," "45" and "34,567,000" for "Amount," "This Quarter" for "Time," and an "Owner Name." In another embodiment, administrator 112 could configure dashboards 214 such that no presets exist. In this embodiment, no filters would be applied by default. In other words, the filters would not be applied upon initialization, and the full underlying data set could be included in dashboards 214.

In 504, method 500 parameterizes the presets and sends parameterized variables to runtime engine 216. In an embodiment, runtime engine 216 subsequently runs queries using the pre-set filters, avoiding redundant queries where appropriate, and then returns appropriate assets top dashboards 214. For example, if analytics platform 106 includes dashboard 214 displaying sales information and the presets limit the data displayed to the viewing user the user can view only their own sales), then the queries run by the runtime engine 216 would apply a predicate limiting the results to the username or id passed in for the viewing user. In another embodiment, runtime engine passes the presets as parameters to an appropriate ancillary function, system, or process and receives results therefrom.

In 506, method 500 receives the results, i.e., assets, from runtime engine 216. In an embodiment, the data is returned in JSON, XML, HTML, or other human-readable format or any format such as binary, PDF, image, video, etc. In 508, method 500 renders the dashboards with assets therein appropriately filtered. One skilled in the arts will appreciate that method 500 could display or render more than one dashboard 214 and more than one asset within dashboard 214 and that the global filters would be applied to all.

Figure 6:
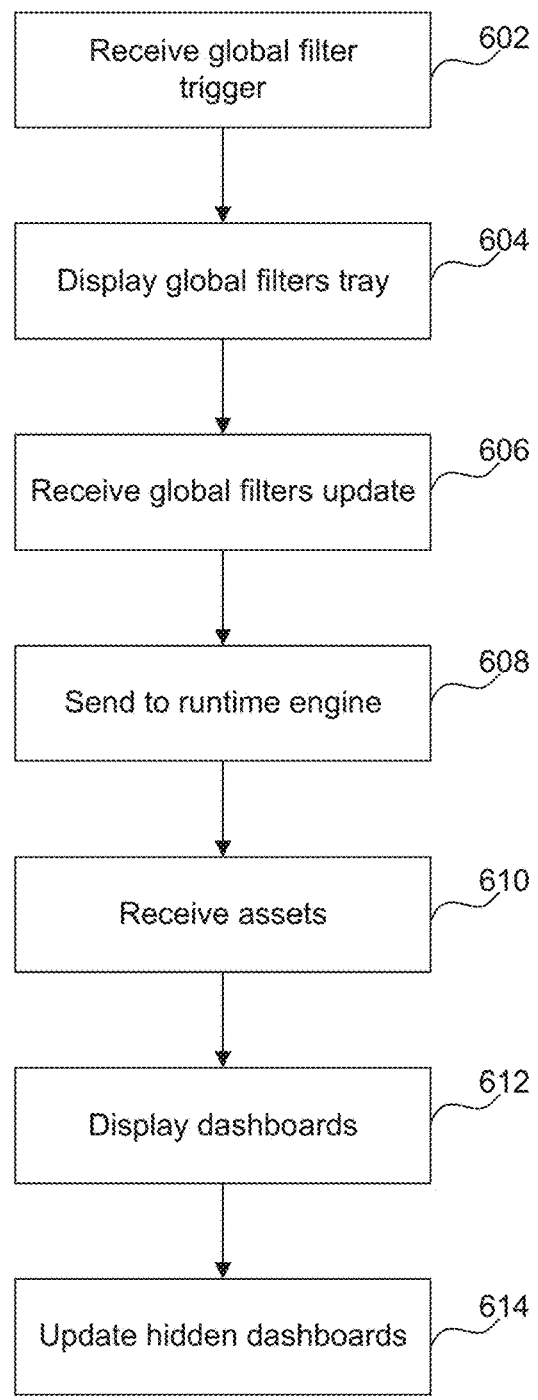
FIG. 6 is a flowchart illustrating a method of updating a dashboard based on a change to the global filter, according to some embodiments.

FIG. 6 is a flowchart illustrating a method of updating dashboards 214 based on a change to global filter tray 404, according to some embodiments.

In 602, receives an activation of global filter icon 402 by processing an input gesture from user 102. User 102 can tap global filter icon 402 with a finger, use a mouse to click global filter icon 402, or utilize any other suitable input mechanism, the nature and breadth of which will be appreciated by a person of ordinary skill in the art.

In 604, method 600 displays global filter tray 404. Global filter tray 404 includes the various filters available to all dashboards 214 in analytics platform 106. An exemplary embodiment of global filter tray 404 can be viewed in FIGS. 4A-4D.

In 606, method 600 receives changes to global filter tray 404 made by user 102. For instance, user 102 could enter a new date range, slide a toggle to a new value or range, enter or select a person's name, or change the global filtering in any other suitable fashion. In the exemplary global filter tray 404 displayed in FIGS. 4A-4D, user 102 could make a selection for "Region" from "MW," "NE," "NW," "SE," and "SW." User 102 could use the slider to select an appropriate "Amount." User 112 could input a filter for "Time" and "Owner Name" either from a dropdown list or by entering text.

In 608, method 600 parameterizes the received global filter changes and sends the parameters to runtime engine 216. In an embodiment, runtime engine 216 subsequently runs needed queries with appropriate limiting predicates built from the selected filters, returning appropriately filtered assets to dashboards 214. For example, if analytics platform 106 includes dashboard 214 displaying sales information and user 102 updates global filter tray 404 to limit the data to their own sales, then runtime engine 216 would apply a predicate to appropriate queries to limit the results to the username or id passed in and relevant to user 102.

In 610, method 600 receives the results, i.e., assets, from runtime engine 216. In an embodiment, the data is returned in JSON, XML, HTML, or other human-readable format or any format such as binary, PDF, image, video, etc. In 612, method 600 renders the dashboards with assets therein appropriately filtered. In 614, method 600 also re-renders or re-populates the data for any hidden dashboards, i.e., those dashboards that are not immediately viewable by user 102 but have still been loaded for easy and fast switching between dashboards utilizing switcher 210. Thus, when user 102 switches between dashboards 214, global filters 212 do not need to be reapplied to the newly selected dashboard 214.

Figure 7:
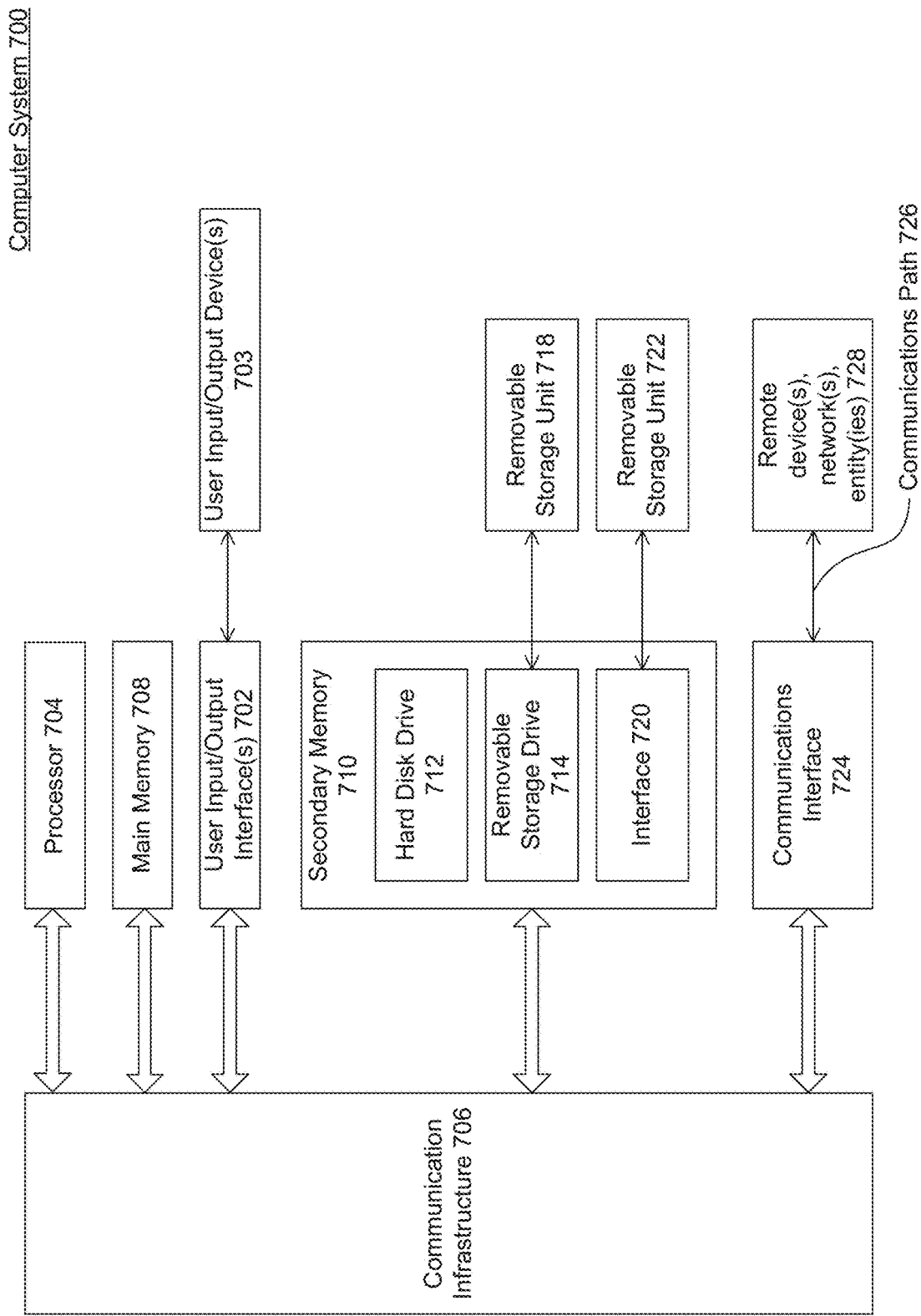
FIG. 7 is an example computer system useful for implementing various embodiments.

Various embodiments can be implemented, for example, using one or more computer systems, such as computer system 700 shown in FIG. 7. Computer system 700 can be used, for example, to implement method 500 of FIG. 5 and method 600 of FIG. 6. For example, computer system 700 can an initialization of an analytics system using pre-set global filters or update. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

The breadth and scope of this disclosure should not be limited by any of the above-described exemplary embodiments, but should be defined only in accordance with the following claims and their equivalents.

What is claimed is:

1. A method, comprising:
    determining, by one or more processors, a list of available filters applicable to widgets comprising one or more displayed widgets in a first dashboard and one or more hidden widgets in a second dashboard, wherein the widgets are configured to display filterable data;
    retrieving, by the one or more processors, pre-configured presets associated with a viewing user and the list of available filters;
    causing, by the one or more processors, display of the first dashboard, wherein the one or more hidden widgets are not immediately viewable in the first dashboard, and wherein the filterable data is initialized based on the pre-configured presets;
    causing, by the one or more processors, display of a global filter tray in a separate layer in response to a selection of a global filter icon together with the one or more displayed widgets in the first dashboard, wherein the global filter tray displays the list of available filters, wherein the global filter tray is independently scrollable, and wherein changes to the first dashboard are presented to the viewing user responsive to updating the list of available filters;
    in response to a selection of a filter applicable to both the one or more displayed widgets and the one or more hidden widgets from the list of available filters, applying, by the one or more processors, the selected filter to the widgets to concurrently refine the filterable data in both the one or more displayed widgets and the one or more hidden widgets;
    in response to a navigation input, causing display of the second dashboard with the selected filter applied to the one or more hidden widgets, wherein the global filter icon and the global filter tray continue to be displayed with the first dashboard and the second dashboard.

2. The method of claim 1, further comprising:
    displaying, by the one or more processors, a number on the global filter icon, wherein the number is a number of filters in the list of available filters.

3. The method of claim 1, further comprising:
    receiving, by the one or more processors, a scrolling input within the global filter tray; and scrolling, by the one or more processors, the global filter tray without adjusting the first dashboard or the second dashboard.

4. The method of claim 1, further comprising:
hiding, by the one or more processors, the global filter tray when an input is received on the global filter icon and the global filter tray is currently displayed.

5. The method of claim 1, further comprising:
displaying, by the one or more processors, the global filter tray when an input is received on the global filter icon and the global filter tray is currently hidden.

6. The method of claim 1, further comprising:
parameterizing the pre-configured presets; and
causing one or more queries to execute using the parameterized pre-configured presets.

7. A system, comprising:
a memory; and
at least one processor coupled to the memory and configured to:
determine a list of available filters applicable to widgets comprising one or more displayed widgets in a first dashboard and one or more hidden widgets in a second dashboard, wherein the widgets are configured to display filterable data;
retrieve pre-configured presets associated with a viewing user and the list of available filters;
cause display of the first dashboard, wherein the one or more hidden widgets are not immediately viewable in the first dashboard, wherein the filterable data is initialized based on the pre-configured presets;
cause display of a global filter tray in a separate layer in response to a selection of a global filter icon together with the one or more displayed widgets in the first dashboard, wherein the global filter tray displays the list of available filters, wherein the global filter tray is independently scrollable, and wherein changes to the first dashboard are presented to the viewing user responsive to updating the list of available filters;
in response to a selection of a filter applicable to both the one or more displayed widgets and the one or more hidden widgets from the list of available filters, apply the selected filter to the widgets to concurrently refine the filterable data in both the one or more displayed widgets and the one or more hidden widgets;
in response to a navigation input, display the second dashboard with the selected filter applied to the one or more hidden widgets, wherein the global filter icon and the global filter tray continue to be displayed with the first dashboard and the second dashboard.

8. The system of claim 7, wherein the at least one processor is further configured to:
display a number on the global filter icon, wherein the number is the number of filters in the list of available filters.

9. The system of claim 7, wherein the at least one processor is further configured to:
receive a scrolling input within the global filter tray; and
scroll the global filter tray without adjusting the first dashboard or the second dashboard.

10. The system of claim 7, wherein the at least one processor is further configured to:
hide the global filter tray when an input is received on the global filter icon and the global filter tray is currently displayed.

11. The system of claim 7, wherein the at least one processor is further configured to:
display the global filter tray when an input is received on the global filter icon and the global filter tray is currently hidden.

12. The system of claim 7, the at least one processor further configured to:
parameterize the pre-configured presets; and
cause one or more queries to execute using the parameterized pre-configured presets.

13. A non-transitory computer-readable device having instructions stored thereon that, when executed by at least one computing device, causes the at least one computing device to perform operations comprising:
determining a list of available filters applicable to widgets comprising one or more displayed widgets in a first dashboard and one or more hidden widgets in a second dashboard, wherein the widgets are configured to display filterable data;
retrieving pre-configured presets associated with a viewing user and the list of available filters;
causing display of the first dashboard, wherein the one or more hidden widgets are not immediately viewable in the first dashboard, and wherein the filterable data is initialized based on the pre-configured presets;
causing display of a global filter tray in a separate layer in response to a selection of a global filter icon together with the one or more displayed widgets in the first dashboard wherein the global filter tray displays the list of available filters, wherein the global filter tray is independently scrollable, and wherein changes to the first dashboard are presented to the viewing user responsive to updating the list of available filters;
in response to selection of a filter from the list of available filters, applying the selected filter to the widgets to concurrently refine the filterable data in the one or more displayed widgets and the one or more hidden widgets;
in response to a navigation input, causing display of the second dashboard with the selected filter applied to the one or more hidden widgets, wherein the global filter icon and the global filter tray continue to be displayed with the first dashboard and the second dashboard.

14. The non-transitory computer-readable device of claim 13, further comprising:
displaying a number on the global filter icon, wherein the number is the number of filters in the list of available filters.

15. The non-transitory computer-readable device of claim 13, the operations further comprising:
receiving a scrolling input within the global filter tray; and
scrolling the global filter tray without adjusting the first dashboard or the second dashboard.

16. The non-transitory computer-readable device of claim 13, the operations further comprising:
hiding the global filter tray when an input is received on the global filter icon and the global filter tray is currently displayed.

17. The non-transitory computer-readable device of claim 13, the operations further comprising:
parameterizing the pre-configured presets; and
causing one or more queries to execute using the parameterized pre-configured presets.

* * * * *